Sept. 3, 1946. C. H. RICHARDS 2,407,099
TWO AND ONE DIRECTION SILENT OVERRIDING AND
POSITIVE DRIVING OVERRIDING MECHANISM
Filed Jan. 22, 1945 3 Sheets-Sheet 2
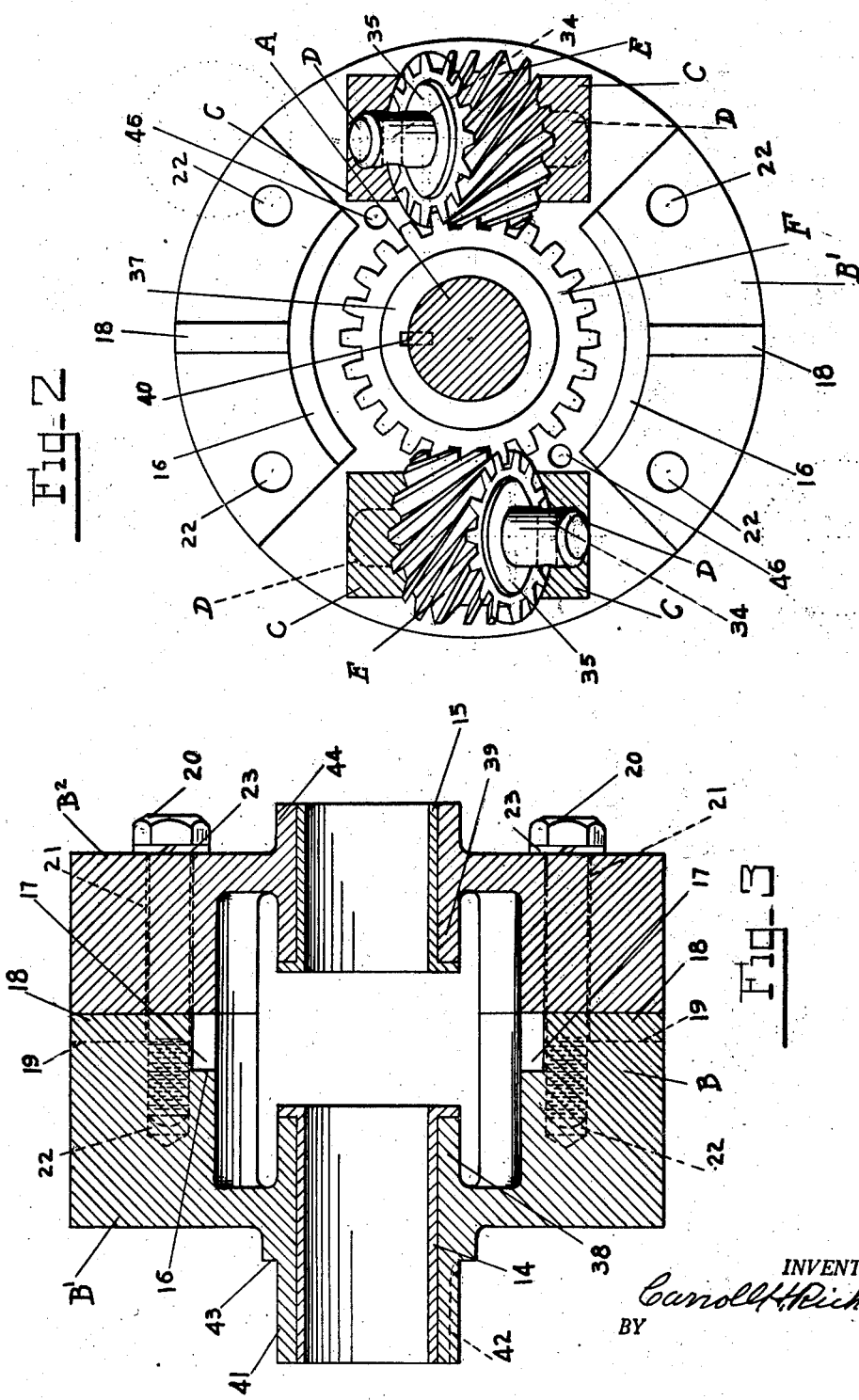
INVENTOR.
Carroll H. Richards
BY

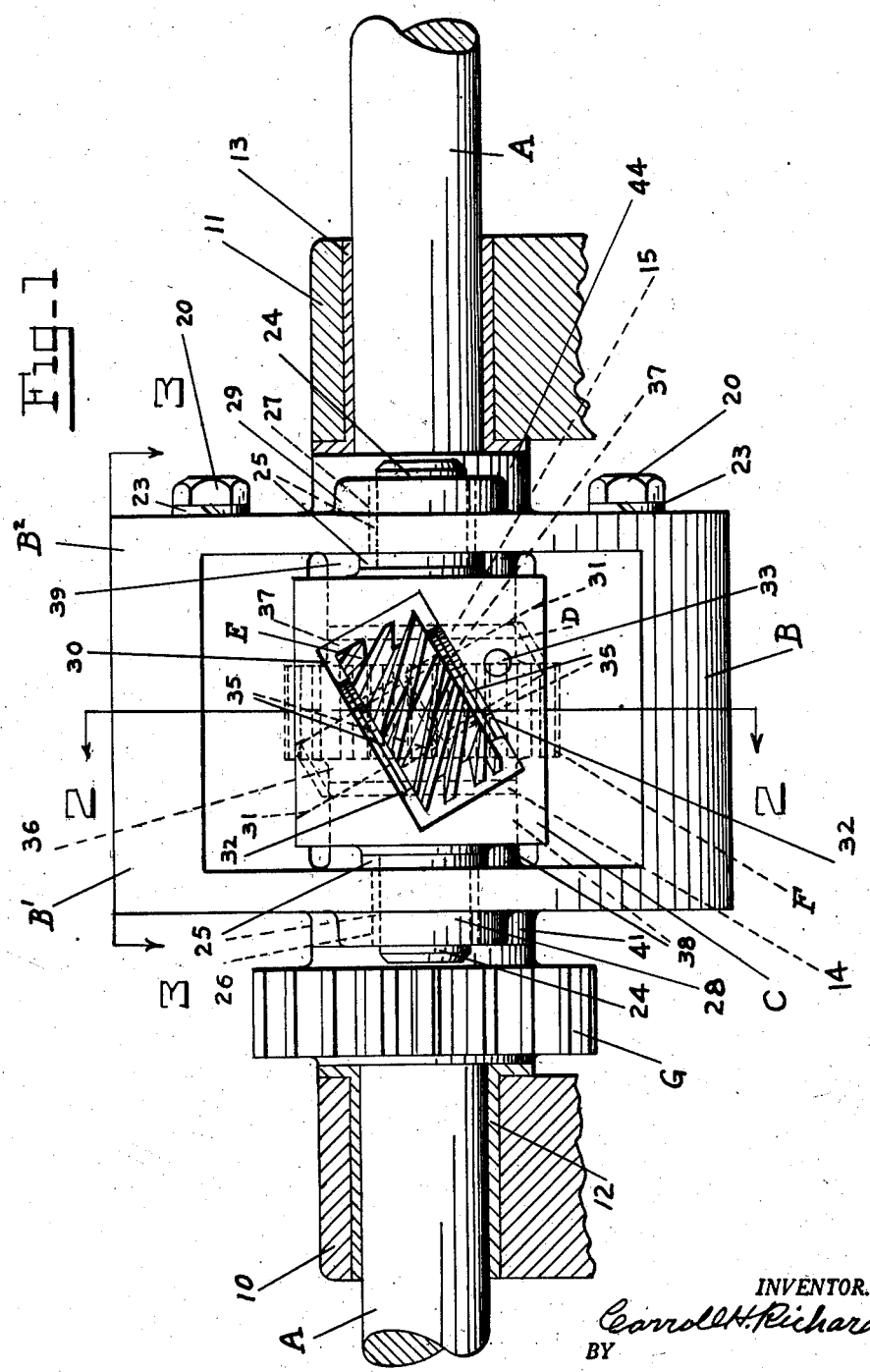

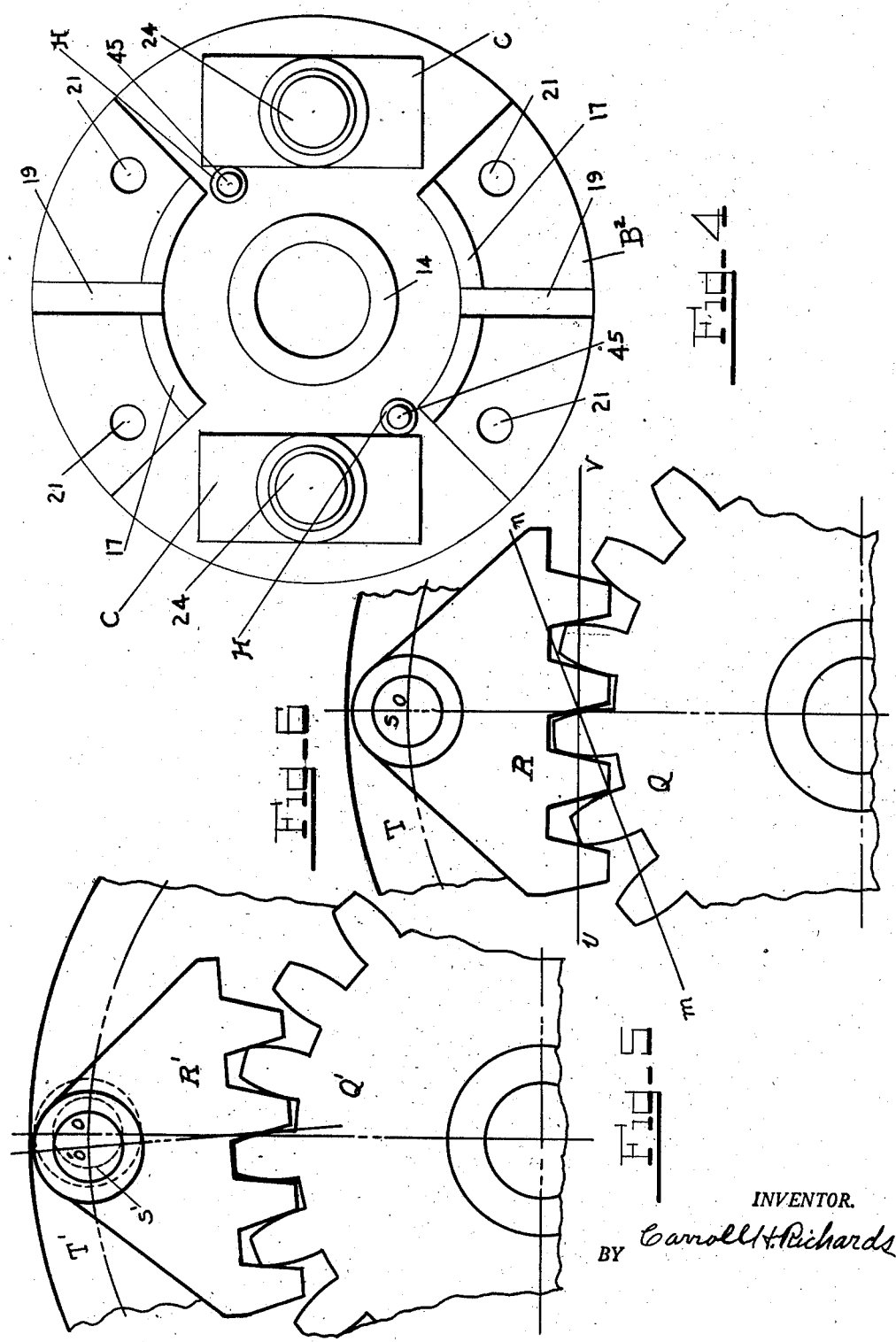

Patented Sept. 3, 1946

2,407,099

UNITED STATES PATENT OFFICE 2,407,099

TWO AND ONE DIRECTION SILENT OVERRIDING AND POSITIVE DRIVING OVERRIDING MECHANISM

Carroll H. Richards, Boston, Mass.

Application January 22, 1945, Serial No. 573,938

6 Claims. (Cl. 192—41)

This invention relates particularly to a two-way or two directional automatic overriding mechanism. Heretofore only one-way overriding mechanisms or those operative in one direction of rotation have been built.

The present overdriving or overriding mechanisms comprise two rotatable members and their driving connections. One of these rotatable members can rotate faster in one direction of rotation only and not impart any appreciable driving force to the other rotatable member or in other words override it. When the first mentioned rotatable member is not rotating faster than the other rotatable member, the last mentioned rotatable member can drive the first mentioned rotatable member at substantially the same speed it is rotating in one direction of rotation only and that direction being the same as the overriding direction of rotation.

At present overriding or overdriving mechanisms can be divided into two types. One of these types has positive driving connections and a very noisy overriding performance. This one is the conventional ratchet drive.

The other type does not have positive driving connections and depends entirely on friction, but has a silent overriding performance. This design is the so called overriding roller clutch or one of its various forms, all of which depend on friction to secure their driving connections.

All designs of overriding or overdriving mechanisms, which depend on friction to establish their driving connections, require a special lubricant. The lubricant must not have a wide change in viscosity with change of temperature, since change in viscosity of the lubricant changes the coefficient of friction and impairs the performance of the mechanisms. It is exceptionally difficult at the present to get a lubricant that will insure good performance at high and extreme low temperatures. Wide changes of viscosity of the lubricant is so vital to the performance of these mechanisms that often they become inoperable at extreme low temperatures and it is necessary, generally when starting, to free-wheel or rotate one of the rotatable members until the temperature of the lubricant is increased to a point where an operable coefficient of friction is had.

Particularly in constant operating heavy duty machines, due to the objectionable noise of the overriding performance of the ratchet design of overriding mechanism and the lost motion that occurs during their operation when their performance changes from the overriding to the driving operation and vice versa, the roller clutch design or one of its forms is preferable. But on account of the excessive pressures required to maintain a frictional driving contact and the bulk entailed to secure these pressures, the roller clutch design is limited in respect to the actual torque it can transmit. The maximum torque that the present roller clutch type of overriding mechanisms can transmit is approximately eight to nine thousand pound feet and this mechanism is very bulky for the work it does.

The paramount objects of this invention are as follows.

To provide an overriding mechanism which when the driving forces applied to its driven members require its overriding or overdriving performance that this performance can be had automatically by one of the rotatable members in either direction of rotation. And when the driving forces applied to its driven members require the driving performance of the mechanism, that this performance can be had automatically by the other of its rotatable members in either direction of rotation.

Also to provide a one or two-way overriding mechanism that embodies the two most desirable characteristics of the two present types of overriding mechanisms, namely: a silent overdrive performance and positive drive for the driving performance. Or in other words to provide a one or two-way overdriving mechanism including the combination of a positive drive and a silent overdrive.

Also to provide a one or two-way overriding mechanism that has a silient overdriving performance, positive driving connections and whose performance is not materially effected by the change in viscosity of the lubricant.

And also to provide a one or two-way overdriving mechanism which has a silient overriding performance and requires less bulk to transmit the same torque comparable to the present silient overdriving mechanisms.

Another object of the invention is to provide the minimum of lost motion when the mechanism changes from its overriding to its driving performance and from its driving to its overriding performance.

Another object of the invention is to provide a gear locking device that does not depend on friction to establish and maintain the lockup condition. Heretofore gear lockups have depended on friction entirely for their performance. In the well known gear lockup, namely: the worm and worm wheel construction in which the worm can drive the worm wheel but the wheel cannot drive the worm; the lockup performance is secured by cutting the worm teeth at such an angle, that the component of the driving force of the wheel never exceeds the frictional resistance.

And another object of the invention is to provide a silent overriding mechanism particularly for heavy duty work that will be very much cheaper to manufacture. This low cost of manufacturing is secured by reducing the size of the mechanism to transmit the torque comparable to the present mechanisms, by eliminating accurate grinding and polishing of the surfaces of the parts and by eliminating the expensive heat treating and hardening processes which require higher price material; all of which is necessary in the construction of the present silent overdriving mechanisms.

The invention is adaptable in any field requiring overriding mechanisms and on account of its new two-way performance characteristic it enlarges the field for these mechanisms.

It is exceptionally useful in the construction of all change speed transmissions using overriding mechanism. And due to its new two-way performance characteristic, it is particularly adapted to change speed transmisisons, which during their performance, require at times that their ultimate drive be reversed; e. g. such transmissions as are required by automotive vehicles and self-propelled rail cars.

Since the invention provides a silent overdriving performance with the minimum of lost motion during its changes of overriding and driving performances and its driving parts constitute mostly gears it is particularly applicable to heavy duty work. On account of its gearing construction the magnitude of the torques it can transmit is limitless or at least as limitless as gearing itself. Therefore the invention, on account of its gear construction, facilitates the transmission of torques by silent overdriving mechanism that have not been possible to transmit heretofore and in this way also widens the field for the use of silent overdriving mechanisms.

In the accompanying drawings:

Fig. 1 is an assembly view of the invention with the main bearings shown in section.

Fig. 2 is a sectional view taken along line 2—2 of Fig. 1 with some of the parts shown in elevation.

Fig. 3 is a full sectional view of one of the rotatable members taken along line 3—3 of Fig. 1.

Fig. 4 is an inside plan view of one of the two parts of one of the rotatable members showing the trunnion blocks in place and rods which limit the trunnion blocks movement.

Fig. 5 is a diagrammatic view to facilitate the description of the operation of the invention.

Fig. 6 is another diagrammatic view to facilitate the description of the operation of the invention.

Referring to the drawings, shaft A, which is also referred to herein as rotatable member A, is adapted to receive a driving torque. Shaft A is journaled in the main bearings 10 and 11. Suitable bushings 12 and 13 form bearing surfaces for shaft A. Bushings 12 and 13 have flanges at their inner ends which function as thrust bearings.

Rotatable member B is loose on shaft A and free to rotate about shaft A. Suitable bushings 14 and 15 located in rotatable member B form bearing surfaces between shaft A and rotatable member B (see Fig. 3). Bushings 14 and 15 have flanges at their inner ends which function as thrust bearings.

Rotatable member B is made of two parts $B^1$ and $B^2$. Annular L-shaped receptacles 16 in part $B^1$, of rotatable member B, receive annular lips 17 of part $B^2$ and locate parts $B^1$ and $B^2$ concentrically.

Tongues 18 of part $B^1$ of rotatable member B, fit into grooves 19 of part $B^2$ and prevent relative rotation of parts $B^1$ and $B^2$.

Bolts 20 pierce part $B^2$ in holes 21 of part $B^2$ and are threaded in holes 22 of part $B^1$ and hold the parts $B^1$ and $B^2$, of rotatable member B together longitudinally. Lock washers 23, located under the heads of bolts 20, prevent bolts 20 from turning.

Trunnion blocks C are rectangular in shape and have shaft portions 24 located substantially in the centers of their smaller sides and integral with the trunnion blocks C. Shaft portions 24 of trunnion block C fit in bushings 25 and are adapted to oscillate in bushings 25. Bushings 25 have flanges on their inner ends, which function as thrust bearings and are located in holes 26 and 27 of parts $B^1$ and $B^2$ respectively, of rotatable member B. Holes 26 and 27 pierce bosses 28 and 29 of parts $B^1$ and $B^2$ respectively of rotatable member B and furnish adequate longitudinal support for bushings 25.

Rectangular holes 30 are located substantially in the center of trunnion block C and the sides of the holes 30 are at a suitable angle to the rectangular sides of trunnion block C. Holes 31 pierce trunnion block C at right angles to the long sides of rectangular holes 30. Bosses 32 are formed concentrically around the holes 31 on the long sides of the rectangular holes 30. The center lines of the holes 31 and the center lines of the shaft portions 24 of trunnion blocks C intersect at the cubical centers of rectangular holes 30.

Shafts D are located in holes 31 of trunnion blocks C, are held in place and prevented from turning by taper pins 33 which piece the trunnion blocks C and pierce shafts D in holes 34 of shafts D. Helical gears E have bushings 35 split at their centers longitudinally of the bores. Bushings 35 have flanges at their outer ends which function as thrust bearings. Helical gears E are loosely mounted on shafts D and free to rotate about shafts D. Bushings 35 form bearing surfaces between shafts D and helical gears E. The flanges of bushings 35 contact with the faces of bosses 32 of trunnion blocks C and form thrust bearings.

A spur gear F keyed by key and key ways 40 to shaft A or rotatable member A meshes with helical gears E. The angle that shafts D make with shaft A is the same as the helical angle of the teeth of helical gears E.

The end of hub projection 36 of spur gear F contacts the face of the flange of bushing 14, the flange of the bushing 14 being supported by the inner end of the inner hub projection 38 of part $B^1$ of rotatable member B. The flange of bushing 14 functions as a thrust bearing and receives the thrust offered by spur gear F in the direction of bushing 14. The end of the hub projection 37 of spur gear F contacts the face of the flange of bushing 15, the flange of bushing 15 being supported by the inner end of the inner hub projection 39 of part $B^2$ of rotatable member B. The flange of bushing 15 functions as a thrust bearing and receives the thrust offered by spur gear F in the direction of bushing 15.

Gear G fits over the outer hub projection 41 of part B¹ of rotatable member B and is keyed to it in key way 42 of hub projection 41, the key and key way of the gear not shown (see Fig. 3). The end of the inner projection of the hub of gear G fits flush against the shoulder 43 of part B¹ of rotatable member B and the outer end of outer projection of the hub of gear G contacts the face of the flange of bushing 12 in the main bearing 10. The flange of bushing 12 is supported by the inner ends of the housing of the main bearing 10. Outer hub projection 41 of part B¹ of rotatable member B is not as long as the total width of gear G and since the outer end of the outer projection of the hub of gear G contacts the face of the flange of bushing 12, the flange of bushing 12 functions as a thrust bearing to receive any thrust from gear G and rotatable member B in the direction of bushing 12. Gear G receives the driving torque to drive rotatable member B.

The outer end of the outer projection 44 of the hub of part B² of rotatable member B contacts the face of the flange of bushing 13 of main bearing 11. The flange of bushing 13 functions as a thrust bearing and receives any thrust offered by rotatable member B in the direction of the bushing 13 and the main bearing 11.

Rods H (see Fig. 4) span the distances between the inside faces of parts B¹ and B² of rotatable member B, contact one set of ends of the trunnion blocks C and limit the movement of trunnion blocks C. The ends 45 of rods H are smaller than the main bodies of the rods H and fit into holes 46 (see Fig. 2) in the sides of parts B¹ and B² of rotatable member B. Shoulders of the rods H, formed by the difference in diameters of the ends 45 of the rods H and the main bodies of these rods, fit tight against the inner faces of the parts B¹ and B² of the rotatable member B; so that when bolts 20 are tightened and bring the parts B¹ and B² of rotatable member B together, the rods H are held firmly in place. These rods H are installed in the device only when it is required that rotatable member B can only be able to drive rotatable member A or shaft A in one direction of rotation, which will be more fully explained in that which follows.

To briefly describe the operation of the invention, when rods H are not installed, rotatable member B, when capable of rotating faster than rotatable member A or shaft A, will drive rotatable member A automatically in either direction of rotation. And when rotatable member A or shaft A is capable of rotating faster than rotatable member B, rotatable member A can automatically override or free-wheel by in either direction of rotation without imparting any appreciable driving force to rotatable member B.

Assuming that rotatable member B is capable of rotating faster than rotatable member A, rotatable member B would receive its driving force through gear G. Since the gear teeth of helical gears E have the same helical angle as the angle their shafts D make with shaft A, the contacts of the teeth of the helical gears E and the teeth of spur gear F are substantially parallel to the axis of shaft A. When rotatable member B rotates faster than rotatable member A or shaft A; helical gears E and their shafts D are moved bodily around spur gear F as helical gears E and their shafts D are located and carried in the trunnion blocks C, which in turn are carried by rotatable member B and are free to oscillate on their shaft portions 24 in bearings which are bushings 25 firmly fastened in holes 26 and 27 in rotatable member B. Due to the conditions disclosed in the immediate foregoing, the trunnion blocks C oscillate and cause the helical gears E and spur gear F to have a performance similar to a rack and spur gear, in which the rack may oscillate in bearings in a rotatable member and is carried around the spur gear by the rotatable member (see diagrammatic view Fig. 5). In diagrammatic view Fig. 5 Q' represents a gear analogous to spur gear F, R' is a rack which is rotatively attached to shaft S' and shaft S' is free to oscillate in a bearing in rotatable member T'. Rack R', shafts S' and rotatable member T' are analogous to trunnion block C, helical gear E and rotatable member B, when the rotatable member B drives rotatable member A and the performance is similar to the rack performance just immediately described.

When rotatable member B starts to rotate faster than rotatable member A, the gear teeth of helical gears E contacting the gear teeth of spur gear F along a line substantially parallel to the axis of rotation of rotatable member A or shaft A, which was explained in the foregoing, causes the trunnion blocks C to oscillate and the helical gears E are turned about the centers of oscillation of the trunnion blocks C and not about the centers of rotations of helical gears E. The helical gears E now perform as a rack carried around spur gear F by rotatable member B substantially the same as the rack and gear relation shown in diagrammatic view Fig. 5. This oscillation of trunnion blocks C causes helical gears E to have their pitch planes intersect or at least no longer be parallel to the pitch plane of their mating spur gear F according to the gear design and either the teeth of the helical gears E contact the bottom of the gear tooth spaces of spur gear F or vice versa; depending on the relative positions of the teeth of helical gears E and the teeth of the spur gear F and also the direction of rotation at the time rotatable member B starts to rotate faster than rotatable member A (see Fig. 5).

It is obvious from the immediate foregoing description, that either the teeth of the helical gears E will contact the bottom of the gear tooth spaces of spur gear F or vice versa; that a lockup will be had when rotatable member B rotates faster than rotatable member A and that rotatable member B will drive rotatable member A in either direction of rotation. It is apparent that this gear lockup does not depend on friction and it will be found all present gear lockups do depend on friction to secure the lockup condition.

When rotatable member A or shaft A rotates faster than rotatable member B in either direction of rotation, spur gear F will drive helical gears E and they will idle about their shafts D. The line of action of the mating gear teeth of helical gears E and spur gear F would be analogous to the approximate line $mn$ (see Fig. 6). The driving force imparted by spur gear F to the helical gears E would be along lines which would be common tangents to the pitch circles of helical gears E and the pitch circle of spur gear F and would be analogous to the line $uv$ (see Fig. 6). The angle made by these lines intersection would be the pressure angle and the driving force multiplied by the tangent of this angle would be the force which tends to force the centers of helical gears E and the center of spur gear F apart. The diagrammatic view Fig. 6 shows a rack R rotatively attached to a shaft S journaled in a rotatable member T and rack R meshing with gear Q. By inspection it is obvious from Fig. 6, that the tooth pressures to force the centers of helical gears E and the center of spur gear F apart, are equal on each side of the centers of oscillation of trunnion blocks C, act substantially at the same distance from the centers of oscillation of trunnion blocks C or through the same lever arm and that these pressures are balanced. Therefore it follows that the gear teeth pressures to force the centers of helical gears E and the center of spur gear F apart does not in any way tend to oscillate trunnion blocks C when gear F is rotating faster than rotatable member B.

It is obvious that once the helical gears E are rotating about their own axes of rotation that another force is set up to keep the pitch planes of helical gears E and the pitch plane of their mating spur gear F parallel, e. g. the gyroscopic effect due to their rotation or the tendency to stay in their planes of rotation. And the greater the speed of rotation of helical gears E, the greater this force or tendency becomes to cause helical gears E to stay in their planes of rotation.

The center lines of the shaft portions 24 of trunnion blocks C intersect the center lines of shafts D, about which helical gears E rotate, all of which has been stated before herein. The driving force imparted by gear teeth of spur gear F to the gear teeth of helical gears E is along lines that are common tangents to the pitch circles of helical gears E and the pitch circles of spur gear F, during the overriding performance. Since the center lines of shafts D, about which helical gears rotate, intersect the center lines of shaft portions 24 of trunnion blocks C, the driving force imparted by the gear teeth of spur gear F to the gear teeth of helical gears E is transmitted to the trunnion block C along lines perpendicular to the center lines of oscillation of trunnion block C, and there can be no component of the driving force to cause the trunnion blocks C to oscillate about their axes of rotation; so when, shaft A to which spur gear F is keyed rotates faster in either direction of rotation, shaft A or rotatable member A overrides or free-wheels by rotatable member B, helical gears E idle on their shafts D and no appreciable driving force is imparted to rotatable member B.

When the rotatable member B is driving rotatable member A or shaft A, the invention performs similarly to a rack and spur gears as has been afore described and the relations of the gear teeth are shown in Fig. 5, the drive being in a counterclockwise direction. If during this driving performance (now referring to Fig. 5) gear Q' should be driven in a counterclockwise direction faster than rotatable member T', which is now assumed to be doing the driving, it is obvious from inspection of Fig. 5 that the driving force of gear Q' would cause the rack R' to rotate with shaft S', shaft S' turning in its bearing in rotatable member T'. If rotatable member B was doing the driving and was driving rotatable member A, through helical gears E and spur gear F in either direction of rotation, then should rotatable member A be driven faster in the direction it was being driven, the gear teeth of spur gear F and the teeth of helical gears E would have practically the same relation to each other as shown in diagrammatic view Fig. 6, since the driving force of spur gear F imparted to helical gears E, would cause the trunnion blocks C to rotate until the relation of the teeth of spur gear F and the teeth of helical gears E would have practically the same relation to each other as the relation of teeth of gear Q and rack R in diagrammatic view Fig. 6. After the gear teeth of spur gear F and the teeth of helical gears E have taken up the relation to each other, just described and shown in Fig. 6; if the rotatable member A or shaft A to which spur gear F is keyed, continues to rotate faster than rotatable member B, helical gears E will idle on their shafts D and no appreciable drive will be imparted by rotatable member A to rotatable member B and rotatable member A will continue to override or free wheel by rotatable member B.

Since the overriding or overdriving performance of the invention entails the idling of helical gears which is a quiet operation, this performance is the same as that of the so-called roller clutch design of overdriving mechanism. And since the gear teeth contact the bottoms of the gear tooth spaces during the driving performance, the drive is positive the same as the ratchet design of overdriving mechanisms.

When the rods H are installed in the invention (see Fig. 4), the trunnion block C can only oscillate in one direction to cause the helical gears E and spur gear F to lockup. The purpose of the rods H is to provide a device embodied by the invention in which rotatable member B can drive rotatable member A in only one direction of rotation. Rods H span the distance between the inner sides of parts $B^1$ and $B^2$ of rotatable member B and are located to contact one set of ends of the trunnion blocks C as shown in (Fig. 4) and if rotatable member B rotates in a direction away from the centers of oscillation of trunnion blocks C and toward the rods H, trunnion blocks C contact the rods H and are prevented from oscillating to cause the helical gears E and spur gear F to lockup and rotatable member B overrides or free wheels by rotatable member A; the pitch planes of helical gears E and spur gear F remaining parallel, helical gears E idle on their shafts D and no appreciable drive is imparted to rotatable member A by rotatable member B.

Sensitiveness of the invention to free-wheeling or overriding depends on the magnitude of the helical angle of the teeth of the helical gears E, within practical limits. The larger the helical angle of the teeth of the helical gears E, the greater the component force of the driving force of spur gear F is, to cause the helical gears E to rotate. But when a spur gear operates with a helical gear the angle made by their shafts must equal the helical angle of the teeth of the helical gear and when these shafts' angle is increased in the invention, the length of the device is increased.

Overdriving mechanisms are often connected with other mechanisms which operate in a bath of lubricant and are lubricated in this manner. To lubricate the present silent overriding mechanisms, it is practically imperative to operate them in a bath of lubricant as they must have ample amount of lubricant and one that does not widely change its viscosity for changes of temperature of the lubricant. Since the change of viscosity of the lubricant is not vital to the performance of the invention and its driving mechanism is mostly gearing, any method of lubrication and any lubricant that is satisfactory for the operating of gearing is satisfactory for the operation of the invention.

The thrust bearings of the invention carry very light loads, as there is only rotation of the helical gears E during the overriding performance, and the driving force, applied to these helical gears E, is a force sufficient to cause them to idle on their shafts. It is obvious that the component of the driving force to idle the helical gears E, that causes the thrust the bearings must receive, would be very light.

Diagrammatic view Fig. 6 shows substantially the relative positions of the teeth of helical gears E similarly to the teeth of rack R and the teeth of spur gear F similarly to the teeth of gear Q, when rotatable member A is overriding rotatable member B and spur gear F is idling helical gears E.

Diagrammatic view Fig. 5 shows substantially the relative positions of the teeth of helical gears E similarly to the teeth of rack R' and the teeth of spur gear F similarly to the teeth of gear Q' when rotatable member B is driving spur gear F and rotatable member A.

From diagrammatic view Fig. 5 it will be seen that the center of the shaft S' at O was the center of the shaft during the overriding performance, and to cause rotatable member T' to take up the drive, that there must be a movement of rotatable member T' sufficient to cause the center of shaft S' to take the position designated as O' and that this movement is limited by the amount of clearance between the top of the teeth and bottoms of the tooth spaces of the teeth of gear Q' and the teeth of rack R' similar to the amount of clearance between the tops of the teeth and bottoms of the tooth spaces of spur gear F and helical gears E.

Likewise from inspection of diagrammatic views Figs. 5 and 6 the slight rotation of gear Q' to cause the teeth of gear Q' and rack R' to have their relative positions as shown in Fig. 6 by the gear Q and the rack R to facilitate the overriding performance, depends on the clearance between the top of the teeth and the bottom of the tooth spaces. Therefore it is obvious that the lost motion entailed by changing from a driving performance to an overriding performance and vice versa can be held to a minimum by holding the tooth clearance to a minimum within practical limits.

When rods H are installed in the invention the performance of the mechanism is practically the same as any overriding present mechanism with the exception that it embodies the combination of a silent overriding and positive driving operation and the change in the viscosity of the lubricant due to change in temperature does not materially effect its performance. The teeth of gears E can have practically any helical angle within practical limits as the rods H limiting the movement of trunnion blocks C insure smooth operation. However the sensitiveness of the mechanism to overriding or free-wheeling depends on the helical angle of the teeth of helical gears E, the greater this helical angle within operable limits the more sensitive the mechanism is to the overriding performance. The rods H, limiting the movement of trunnion blocks C, make sure that the pitch planes of the helical gears E and their mating spur gear F remain parallel for the overriding operations of the mechanism.

I claim:

1. In a mechanism having a pair of elements rotatable about a common axis, the combination therewith of a gear having a driving connection with one of said elements, a member mounted in the other element for rotation relative thereto, a second gear, said second gear being mounted in said member for rotation relative thereto and adapted to mesh with the first gear, said member and said second gear being rotatable about different axes, the axis of rotation of said member being spaced from the axis of the first gear, and means for rotating one of said elements.

2. In a mechanism having a pair of elements rotatable about a common axis, the combination therewith of a gear having a driving connection with one of said elements, a member mounted in the other element for rotation relative thereto, a second gear, said second gear being mounted in said member for rotation relative thereto and adapted to mesh with the first gear, said member and said second gear being rotatable about different axes, the axis of rotation of said member being spaced from the axis of the first gear, means preventing substantial rotation of said member in one direction, and means for rotating one of said elements.

3. In a mechanism having a pair of elements rotatable about a common axis, the combination therewith of a spur gear having a driving connection with one of said elements, a member mounted in the other element for rotation relative thereto about an axis parallel to the axis of said spur gear, a helical gear mounted in said member for rotation relative thereto and adapted to mesh with said spur gear, the axis of said helical gear being inclined to the axis of rotation of said member at an angle substantially equal to the helical angle of the helical gear, and means for rotating one of said elements.

4. In a mechanism having a pair of elements rotatable about a common axis, the combination therewith of a spur gear having a driving connection with one of said elements, a member mounted in the other element for rotation relative thereto about an axis parallel to the axis of said spur gear, a helical gear mounted in said member for rotation relative thereto and adapted to mesh with said spur gear, the axis of said helical gear being inclined to the axis of rotation of said member at an angle substantially equal to the helical angle of the helical gear, means preventing substantial rotation of said member in one direction, and means for rotating one of said elements.

5. In a mechanism having a pair of elements rotatable about a common axis, the combination therewith of a driven gear carried by one of said elements to rotate therewith, a gear adapted to act as a driving member and adapted to mesh with said driven gear, and means rotatably carried by the other of said elements for supporting said driving member for rotation about its own axis and for rotation of its own axis about a second axis spaced from the axis of rotation of said driven gear.

6. In a mechanism having a pair of elements rotatable about a common axis, the combination therewith of a driven gear carried by one of said elements to rotate therewith, a gear adapted to act as a driving member and adapted to mesh with said driven gear, means rotatably carried by the other of said elements for supporting said driving member for rotation about its own axis and for rotation of its own axis about a second axis spaced from the axis of rotation of said driven gear, and means preventing substantial rotation of the axis of said driving member about said second axis in one direction.

CARROLL H. RICHARDS.